(12) United States Patent
Philipp et al.

(10) Patent No.: US 11,914,120 B2
(45) Date of Patent: Feb. 27, 2024

(54) WINDSHIELD CORRECTIVE OPTIC FOR FORWARD FACING CAMERAS

(71) Applicant: GM Global Technology Operations LLC, Detroit, MI (US)

(72) Inventors: Tzvi Philipp, Bet Shemesh (IL); Brian Yousif-Dickow, Farmington Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 258 days.

(21) Appl. No.: 17/396,144

(22) Filed: Aug. 6, 2021

(65) Prior Publication Data
US 2023/0044227 A1   Feb. 9, 2023

(51) Int. Cl.
*G02B 13/18* (2006.01)
*B60R 11/04* (2006.01)

(52) U.S. Cl.
CPC .............. *G02B 13/18* (2013.01); *B60R 11/04* (2013.01)

(58) Field of Classification Search
CPC ......... G02B 13/18; B60R 11/04; B60R 1/001; B60R 2011/0026; B60R 1/24
See application file for complete search history.

(56) References Cited

U.S. PATENT DOCUMENTS

| | | | |
|---|---|---|---|
| 10,175,459 B2* | 1/2019 | Kim | G02B 9/60 |
| 2012/0147483 A1* | 6/2012 | Oskotsky | G02B 13/18 |
| | | | 359/753 |
| 2014/0362219 A1* | 12/2014 | Seger | G02B 17/086 |
| | | | 348/148 |
| 2015/0316688 A1* | 11/2015 | Cefalo | G02B 1/14 |
| | | | 252/586 |
| 2020/0017037 A1* | 1/2020 | Masui | H04N 23/55 |
| 2020/0320681 A1* | 10/2020 | Gandra | B60J 1/02 |
| 2020/0353816 A1* | 11/2020 | Hirata | H04N 9/3194 |
| 2022/0413102 A1* | 12/2022 | Li | G01S 17/931 |

FOREIGN PATENT DOCUMENTS

| | | |
|---|---|---|
| DE | 102009027520 A1 | 1/2011 |
| DE | 102018207105 A1 | 11/2019 |

* cited by examiner

*Primary Examiner* — Balram T Parbadia
*Assistant Examiner* — Gabriel A Sanz
(74) *Attorney, Agent, or Firm* — Vivacqua Crane PLLC

(57) ABSTRACT

A windshield corrective optical system includes a motor vehicle having a windshield. A camera is positioned within an occupant compartment of the motor vehicle directed toward the windshield and receiving light rays passing through the windshield. A sensor is configured to receive the light rays. A corrective element is configured to allow passage of the light rays through the corrective element to the sensor. The corrective element corrects aberrations of the light rays induced by passing through the windshield prior to the light rays reaching the sensor.

15 Claims, 5 Drawing Sheets

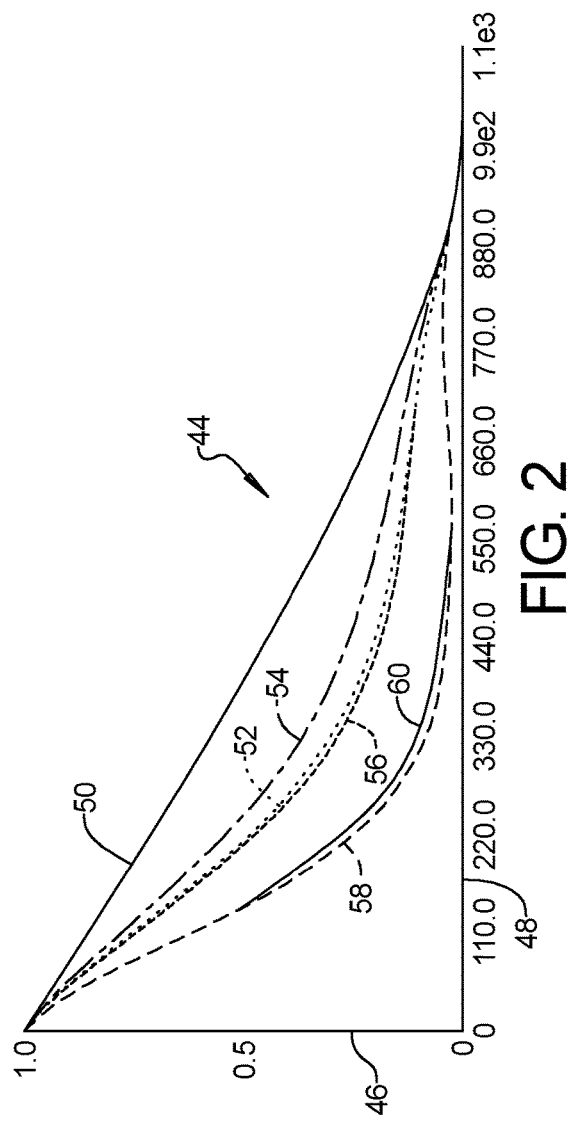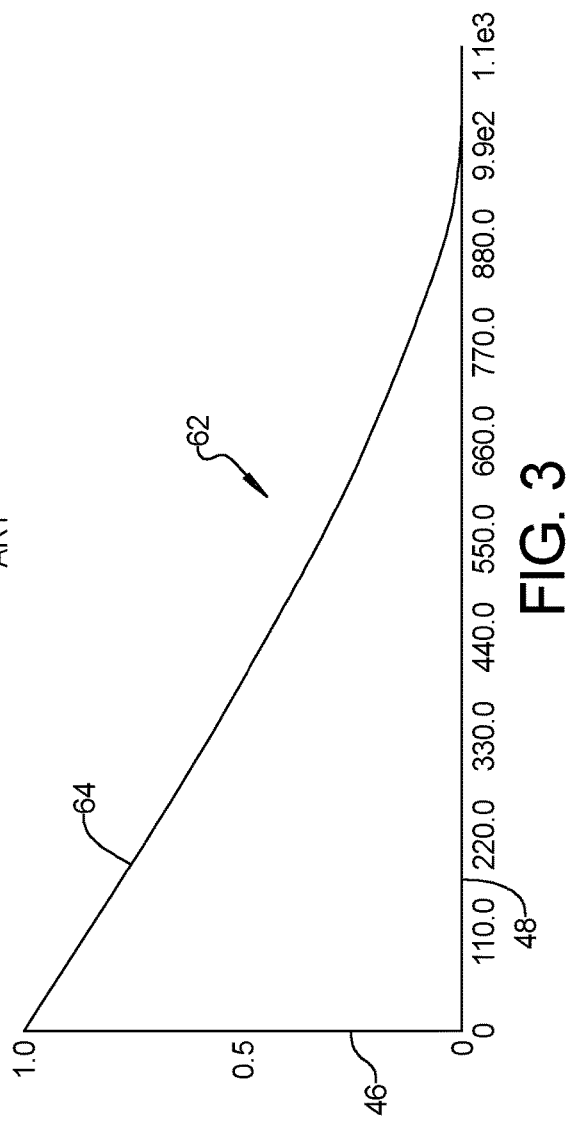

WINDSHIELD CORRECTIVE OPTIC FOR FORWARD FACING CAMERAS

INTRODUCTION

The present disclosure relates to motor vehicle windshield camera systems.

Motor vehicle windshields are commonly provided with a camera positioned within a motor vehicle passenger compartment and an associated viewing system. The viewing system receives light images through the windshield and monitors objects which appear in the camera field-of-view (FOV). Windshields are commonly provided with a rake angle to mitigate air resistance and to reduce impact damage from objects striking the windshield. The rake angle of the windshield creates aberrations resulting in a degradation in the resultant camera view images that may reduce the performance of perception algorithms of the viewing system. The degradation of the FOV is most noticeable in a tangential (vertical) direction, the same direction as the windshield rake angle.

Thus, while current motor vehicle windshield camera systems achieve their intended purpose, there is a need for a new and improved system and method for motor vehicle forward facing windshield cameras.

SUMMARY

According to several aspects, a windshield corrective optical system includes a motor vehicle having a windshield. A camera positioned within an occupant compartment of the motor vehicle is directed toward the windshield and is positioned to receive light rays passing through the windshield. A sensor is configured to receive the light rays passing through the windshield. A corrective element is positioned to pass the light rays through the corrective element to the sensor. The corrective element is configured to correct aberrations of the light rays induced by passing through the windshield prior to the light rays reaching the sensor.

In another aspect of the present disclosure, the windshield is oriented at a rake angle; and the corrective element is oriented at a corrective angle oriented substantially opposite to the rake angle.

In another aspect of the present disclosure, the corrective element is positioned within the camera.

In another aspect of the present disclosure, the sensor and the corrective element are fixed within the camera with the corrective element located between the windshield and the sensor.

In another aspect of the present disclosure, the camera includes at least a first lens group and a second lens group, with the first lens group, the second lens group and the sensor arranged in series order away from the windshield.

In another aspect of the present disclosure, the first lens group and the second lens group are positioned between the corrective element and the sensor.

In another aspect of the present disclosure, the corrective element is positioned between the first lens group and the second lens group and further including an aperture stop induced point of intersection of the light rays located between the corrective element and the second lens group.

In another aspect of the present disclosure, the corrective element is positioned between the first lens group and the second lens group and further including an aperture stop induced point of intersection of the light rays located between the first lens group and the corrective element.

In another aspect of the present disclosure, the corrective element is positioned between the second lens group and the sensor and further including an aperture stop induced point of intersection of the light rays located between the first lens group and the second lens group.

In another aspect of the present disclosure, the corrective element defines a PK1 glass material as an exemplary material, however, the corrective element material may be other types of glass or a polymeric material.

According to several aspects, a windshield corrective optical system includes a motor vehicle having a windshield oriented at a rake angle and an occupant compartment. A camera is positioned within the occupant compartment directed toward the windshield and receiving light rays passing through the windshield and within a field-of-view (FOV) of the camera. A sensor within the camera receives the light rays. A corrective element positioned within the camera ahead of the sensor allows passage of the light rays through the corrective element to the sensor. The corrective element corrects aberrations of the light rays passing through the windshield induced by the rake angle of the windshield prior to the light rays reaching the sensor.

In another aspect of the present disclosure, the camera includes at least a first lens group and a second lens group, with the first lens group, the second lens group and the sensor arranged in series order away from the windshield.

In another aspect of the present disclosure, the aberrations of the light rays due to a radius of curvature of the windshield in a vertical direction are included in a geometric shape of the corrective element, resulting in the corrective element defining a toroidal optic or a cylindrical optic.

In another aspect of the present disclosure, a first anti-reflective coating applied to a first face of the corrective element, and a second anti-reflective coating applied to an opposite second face of the corrective element.

In another aspect of the present disclosure, the camera includes an imaging system and the imaging system is adapted to generate, transmit and receive LIDAR signals.

In another aspect of the present disclosure, the corrective element is substantially flat, having parallel opposed faces.

In another aspect of the present disclosure, the corrective element defines a PK1 glass material as an exemplary material, however, the corrective element material may be other types of glass or a polymeric material.

According to several aspects, a method for correcting aberrations of light rays passing through a windshield includes: orienting a windshield of a motor vehicle at a rake angle; mounting a camera within an occupant compartment of the motor vehicle directed toward the windshield and receiving light rays through the windshield; locating a sensor within the camera to receive the light rays; and positioning a corrective element within the camera ahead of the sensor to allow passage of the light rays through the corrective element to the sensor, and to correct aberrations of the light rays passing through the windshield induced by the rake angle of the windshield prior to the light rays reaching the sensor.

In another aspect of the present disclosure, the method further includes orienting the corrective element at a corrective angle oriented substantially opposite to the rake angle.

In another aspect of the present disclosure, the method further includes arranging in series order within the camera at least a first lens group, a second lens group and the sensor away from the windshield.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 2 is a graph of a modulus compared to a spatial frequency in cycles per mm for a windshield of known design introducing aberrations into the camera FOV for multiple ranges;

FIG. 3 is a graph modified from FIG. 2 after incorporation of a correction element of the present disclosure;

DETAILED DESCRIPTION

The following description is merely exemplary in nature and is not intended to limit the present disclosure, application, or uses.

Figure 1:
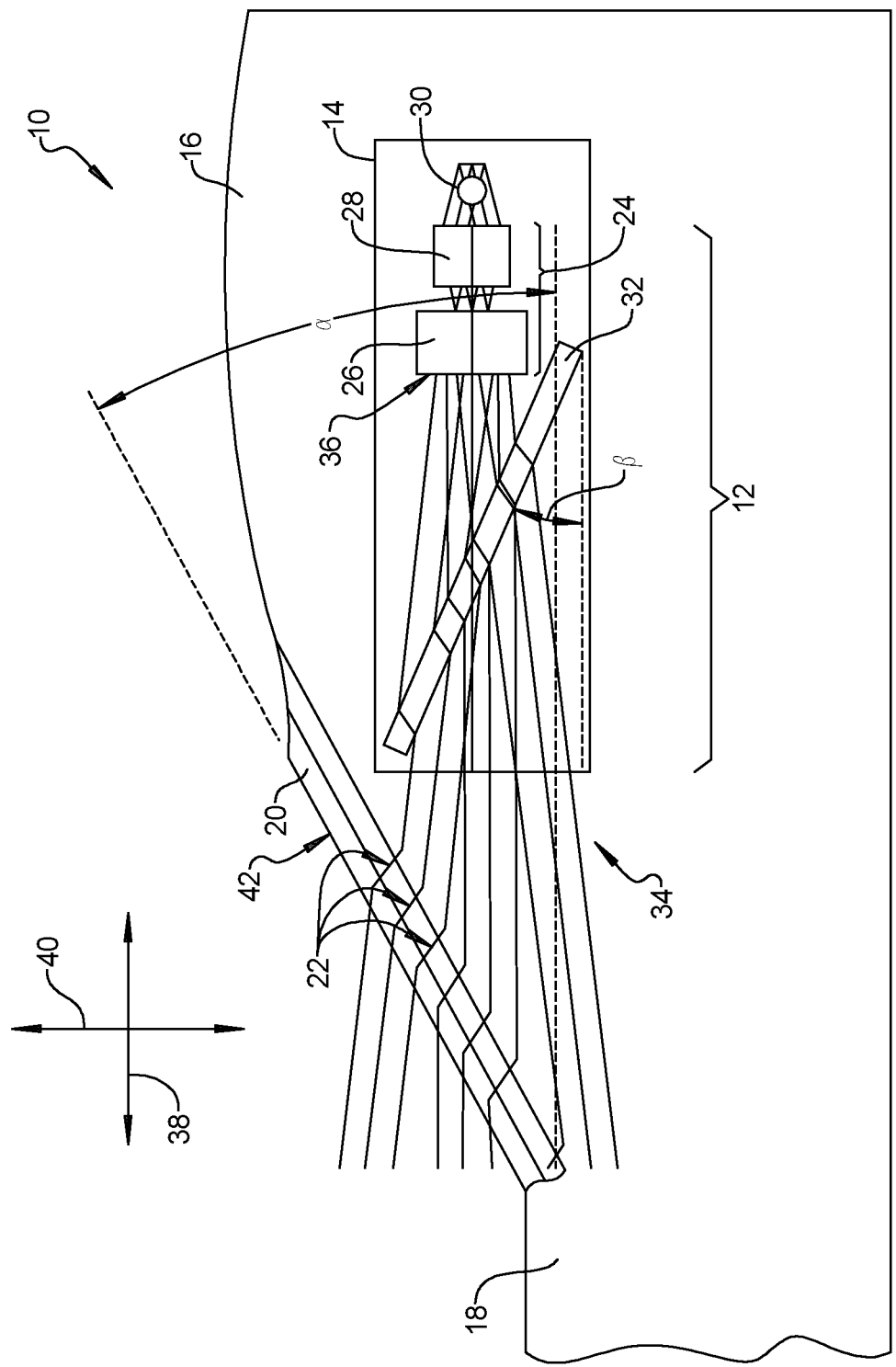
FIG. 1 is a schematic drawing of a windshield corrective optical system according to an exemplary aspect.

Referring to FIG. 1, a windshield corrective optical system 10 is introduced into an optical train 12 of a camera 14 positioned within an occupant compartment 16 of a motor vehicle 18. The camera 14 receives light and image data through a raked vehicle windshield 20. A rake angle alpha (α) of the windshield 20 creates distortions or aberrations 22 in the resultant images that may reduce the performance of perception algorithms applied in an imaging system 24 of the camera 14. The imaging system 24 includes a multiple group imaging lens which for simplicity is described herein as including a first lens group 26 and a second lens group 28. Each of the lens groups may include one or two or more lenses. In general, imaging lens designs use anywhere from one, two, or three or more lenses. In practice, it is common to subdivide the lenses into collections called a "group", where a group can be as few as one lens or any other multiple number of lenses. The subdivision of the lens design into groups allows for easier association of the lens functions, position of elements relative to a "stop" described below, and other design related characteristics of the overall lens design. The imaging system 24 receives and interprets the light and image data via a sensor 30. To correct the aberrations 22 induced by the rake angle α, a corrective element 32 is positioned within a light path 34 of the optical train 12 between the windshield 20 and the sensor 30 to eliminate or reduce a magnitude of the aberrations 22 and restore resolution to the nominal performance of the imaging system 24.

It is noted the windshield corrective optical system 10 applies to camera lenses that are designed without taking into consideration the vehicle windshield geometry and material. For example when a known or "regular" camera lens is used whose field-of-view is degraded due to the aberrations 22 resulting from the windshield geometry, the added modification of the corrective element 32 of the present disclosure should be used. This is distinguished from a camera lens that is designed specifically for use behind a windshield with the camera design taking the geometry of and any aberrations resulting from the windshield into account. Such a camera lens would not need the corrective element 32.

According to several aspects, the corrective element 32 may define a tilted polymeric material such as plastic plate or a glass plate which is inserted between the windshield 20 and a first optical surface 36 of the imaging system 24. The corrective element 32 is oriented at a corrective angle beta (β) which according to several aspects is oriented substantially opposite to the rake angle α of the windshield 20. For example, if the windshield 20 is tilted (raked) at 60 degrees, the corrective element 32 should be tilted to −60 degrees. It is noted this orientation angle of the corrective element 32 is an oversimplification because the exemplary corrective element angle β is functional for a case with a narrow FOV.

According to several aspects the corrective element 32 is a PK1 glass, however the material selected is not limiting, as the corrective element 32 may also be a different type of glass or a polymeric material such as a polycarbonate plastic. An index of refraction of the corrective element 32 is selected to be similar to the index of refraction of the windshield 20 and may be modified to suit a material and a location of the corrective element 32, as well as a geometry of the corrective element 32. According to several aspects the corrective element 32 is substantially flat, having parallel opposed faces, however, according to further aspects one or both of the opposed faces of the corrective element 32 may be curved.

In certain motor vehicle designs the FOV of the camera 14 may be substantial, for example 28 degrees or more in a horizontal or sagittal direction 38. An f-number (F#) of the imaging lens including the first lens group 26 and the second lens group 28 may be considered fast (a large aperture) of 1.8 or less. Therefore, a simple corrective element angle β for the corrective element 32, oriented substantially opposite to the rake angle α of the windshield 20 may not be sufficient in all applications. The corrective element angle β may therefore be optimized using standard optical design techniques for the given rake angle α of the windshield 20 and the specific parameters of the camera 14.

The windshield 20 is commonly made of multiple layers of materials including glass and plastic. An index of refraction of the corrective element 32 is approximately matched to an overall index of refraction of the material of the windshield 20. The optimum glass or plastic material selected for the corrective element 32 may be determined using standard optical design techniques.

A degradation of the FOV is most noticeable in a tangential (vertical) direction 40, the same direction as the windshield rake angle α. An additional parameter for aberration correction is therefore to include a radius of curvature 42 to the windshield 20 in the vertical direction 40, which results in the corrective element 32 being a toroidal optic or cylindrical optic. The corrective element 32 includes a tilt angle however, by having the tilt angle combined with the radius of curvature an improved correction may be achieved.

Referring to FIG. 2 and again to FIG. 1, a graph 44 presents a modulus 46 compared to a spatial frequency in cycles per mm for a windshield of known design introducing aberrations into the FOV. A first curve 50. A first curve 50 presents an optimum modulation transfer function (MTF) in a tangential direction. A second curve 52 presents significant performance degradation and deviates in a sagittal direction with respect to the first curve 50. A third curve 54 deviates from the first curve 50 in a tangential direction and therefore presents a deviation in the MTF. A fourth curve 56 deviates from the third curve 54 in a sagittal direction and deviates with respect to the first curve 50. A fifth curve 58 shows substantial deviation from the first curve 50 in a tangential direction, and a sixth curve 60 deviates from the fifth curve 58 in a sagittal direction and therefore presents a deviation in the MTF.

Referring to FIG. 3 and again to FIGS. 1 and 2, a graph 62 presents a curve 64 having substantially no spacing between sagittal and tangential graph lines across the FOV, and therefore presenting substantially no degradation in MTF. The graph 62 presents data with application of a corrective element such as the corrective element 32 of the present disclosure positioned between the windshield 20 and the sensor 30 of the camera 14. The curve 64 presents a well corrected lens with good, consistent performance across the FOV.

Referring to FIG. 4 and again to FIG. 1, according to several aspects the windshield corrective optical system 10 provides a standard two-group lens assembly for the imaging system 24 having the first lens group 26 and the second lens group 28 mounted behind the windshield 20 and with the corrective element 32 positioned before the two groups of lenses. Individual chief light rays 66 passing through the corrective element 32 are directed into the first lens group 26. An aperture stop as used herein is produced by an opening of the lens which physically limits the solid angle of the rays passing through the system from an on-axis object point to produce a point in space where the chief light rays in the FOV of the camera commonly intersect. According to several aspects an aperture stop of the windshield corrective optical system 10 induces a point of intersection 68 of the chief light rays in the FOV, and is located before the first lens group 26.

Figure 4:
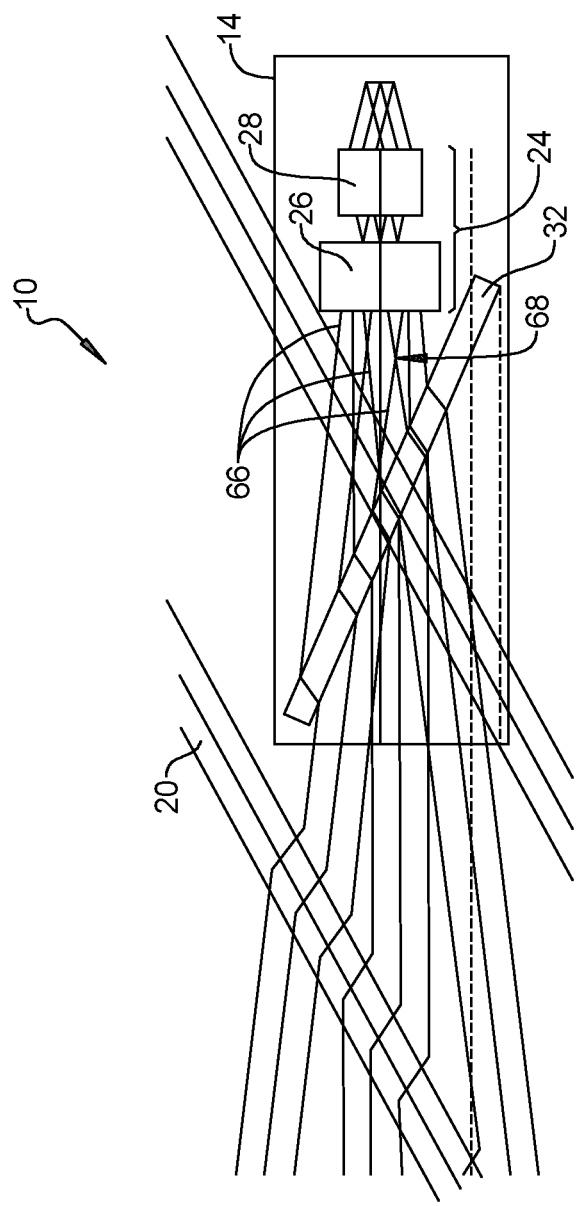
FIG. 4 is a schematic drawing modified from FIG. 1 to incorporate an aperture stop.

Referring to FIG. 5 and again to FIG. 4, according to several aspects a windshield corrective optical system 70 is modified from the windshield corrective optical system 10 to position the corrective element 32 between the first lens group 26 and the second lens group 28. According to several aspects, an aperture stop produces a point of intersection 72 for the windshield corrective optical system 70 is located between the corrective element 32 and the second lens group 28.

Figure 5:
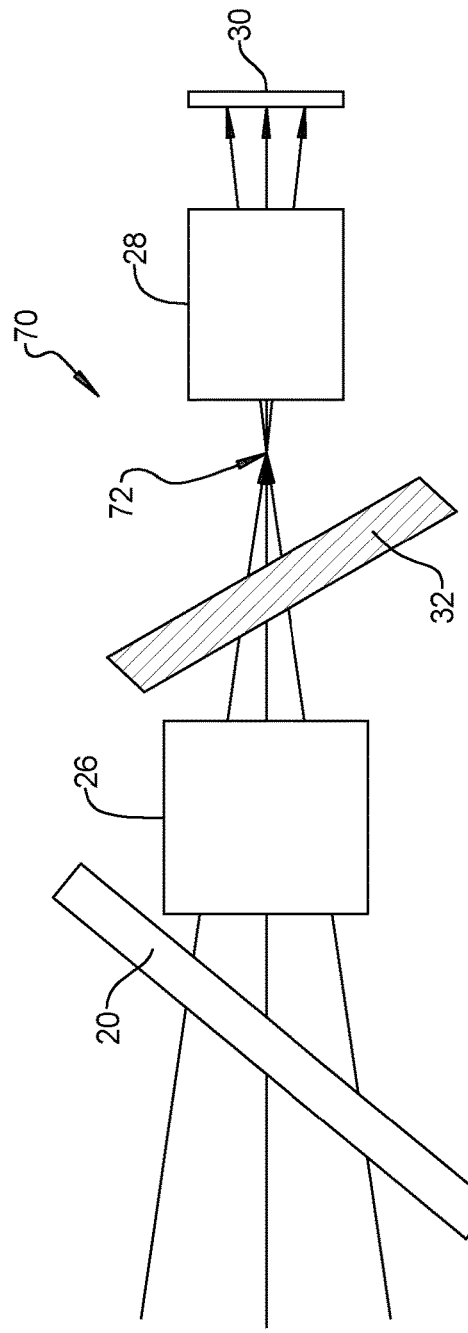
FIG. 5 is a schematic drawing presenting a further aspect of the system of FIG. 1.

Referring to FIG. 6 and again to FIGS. 4 and 5, according to several aspects a windshield corrective optical system 74 is modified from the windshield corrective optical system 70 to position an aperture stop produces a point of intersection 76 between the first lens group 26 and the corrective element 32. Similar to the windshield corrective optical system 70 the corrective element 32 of the windshield corrective optical system 74 is positioned between the first lens group 26 and the second lens group 28.

Figure 6:
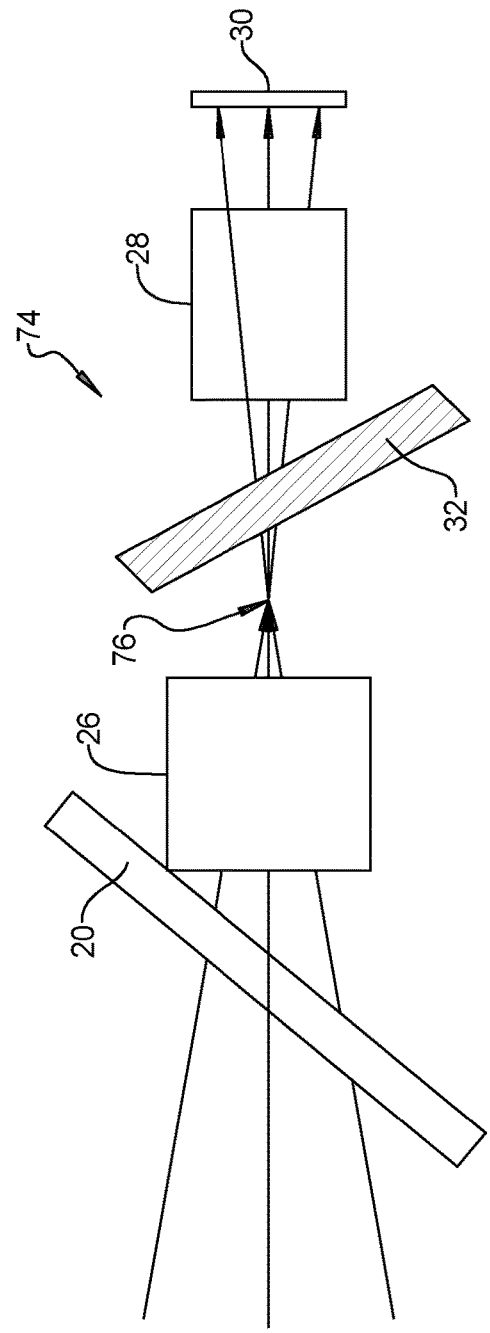
FIG. 6 is a schematic drawing presenting a further aspect of the system of FIG. 1.
Figure 7:
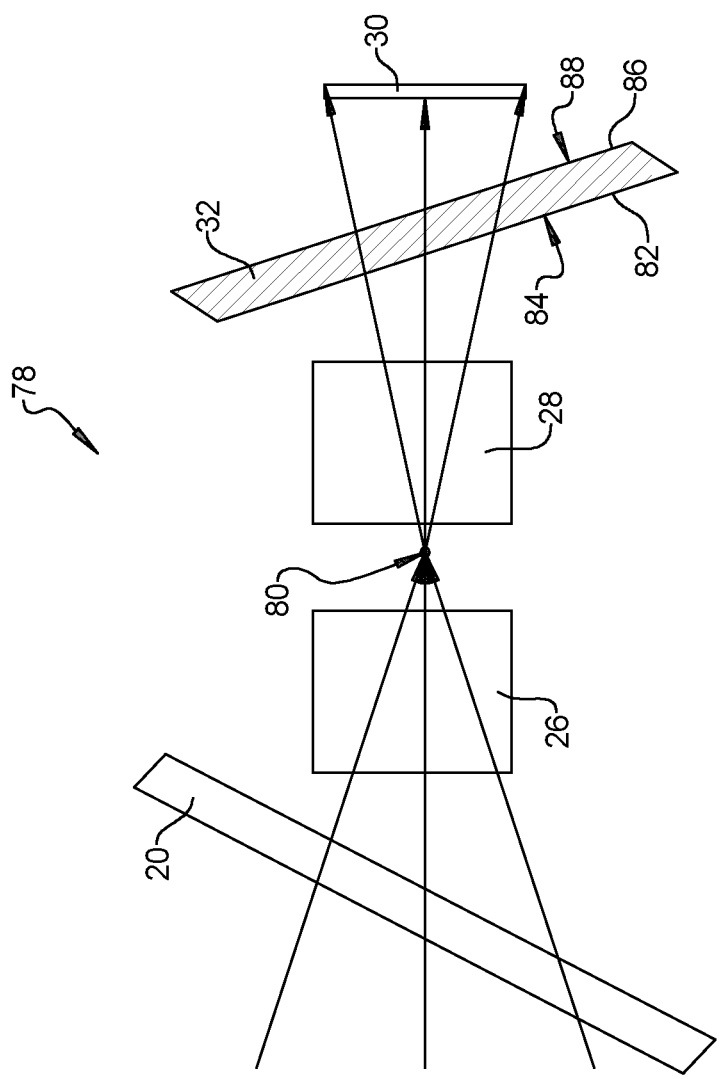
FIG. 7 is a schematic drawing presenting a further aspect of the system of FIG. 1.

Referring to FIG. 7 and again to FIGS. 4 through 6, according to several aspects a windshield corrective optical system 78 is modified from the windshield corrective optical systems 10, 70 and 74 as follows. In this aspect, the corrective element 32 is positioned behind both the first lens group 26 and the second lens group 28 which are both positioned behind the windshield 20, and ahead of the sensor 30. According to several aspects, an aperture stop for the windshield corrective optical system 78 creates a point of intersection 80 located between the first lens group 26 and the second lens group 28.

With continuing reference to FIG. 7 and again to FIGS. 1 through 6, a first anti-reflective coating 82 may be applied to a first face 84 of the corrective element 32, and a second anti-reflective coating 86 may be applied to an opposite second face 88 of the corrective element 32.

A corrective element 32 of the present disclosure may be added to a standard imaging lens design to correct for the aberrations induced by the windshield rake angle α. The corrective element 32 is located between the windshield 20 and the sensor 30 and may be mounted between the windshield 20 and the lens groups, between the lens groups, or between the lens groups and the sensor 30. In lieu of receiving light rays representing the FOV of the camera 14, according to several aspects the imaging system 24 may be modified to generate, transmit and receive light detection and ranging (LIDAR) signals. Lidar provides a method for determining ranges of variable distance by targeting an object with a laser and measuring a time for the reflected light to return to a receiver or sensor. The corrective element 32 may be modified accordingly.

The corrective element 32 of the present disclosure may be positioned prior to the lens groups, or between the lens groups; either prior or post the "aperture stop" point of intersection location. The corrective element 32 may also be located after the last lens element such as the second lens group 28 and prior to the sensor 30, provided there is enough mechanical room to allow for such an element location. The index of the corrective element material may be selected from a variety of any of the standard glasses. For example, a glass such as PK1 (Nd=1.5038 Vd=66.922) may be used for optimization, however the corrective element 32 may also be provided of other glass types or a polymeric material. A glass radii can be taken to be infinite for a first iteration analysis, and the corrective or tilt angle β of the corrective element 32 may be substantially opposite to the value of the rake angle α of the windshield 20. According to several aspects the rake angle α for common motor vehicle windshields may range from approximately 50 to 70 degrees, and the corrective element 32 is designed to correct aberrations throughout this angular range, however the corrective element 32 may be designed to function for substantially any windshield rake angle. While a windshield 20 is described in certain aspects herein, the windshield corrective optical systems of the present disclosure may be applied to any window of the motor vehicle 18.

A windshield corrective optical system of the present disclosure offers several advantages. These include provision of a windshield optical corrective element to avoid using complicated design elements such as free form lenses and their subsequent costs in design and manufacturing. The corrective element of the present disclosure may be adapted to a variety of windshield designs with a variety of rake angles making implementation in various vehicle programs in production simpler.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A windshield corrective optical system, comprising:
   an automobile vehicle having a windshield, the windshield being oriented at a rake angle;
   a camera positioned within a passenger compartment of the automobile vehicle directed toward the windshield and receiving light rays passing through the windshield;
   a sensor receiving the light rays; and a corrective element passing the light rays through the corrective element to the sensor, the corrective element correcting aberrations of the light rays induced by the rake angle of the windshield as the light rays pass through the corrective element prior to the light rays reaching the sensor, the corrective element being positioned within the camera, and the camera being positioned in a line of sight of the windshield such that the light rays travel from the windshield directly to the camera; and wherein the corrective element is oriented at a corrective angle oriented opposite to the rake angle, an absolute value of the rake angle is equal to an absolute value of the corrective angle, the rake angle has a positive value, the corrective angle has a negative value, the camera is elongated along a camera axis, the windshield is elongated along a windshield axis, the rake angle is defined from the camera axis to the windshield axis, the corrective element is elongated along an element axis, the corrective angle is defined from the camera axis to the element axis, the corrective element has a first index of refraction, the windshield has a second index of refraction, the first index of refraction is equal to the second index of refraction, the corrective element has a first surface and a second surface opposite the first surface, the first surface is flat, the second surface is flat, the first surface is parallel to the second surface, the windshield corrective optical system further includes a first anti-reflective coating applied to the first surface of the corrective element, the windshield corrective optical system further includes a second anti-reflective coating applied to the second surface of the corrective element, the first index of refraction is 1.5038, the corrective element has an Abbie number, the Abbie number is 66.922, the rake angle is 60 degrees, and the corrective angle is −60 degrees.

2. The windshield corrective optical system of claim 1, wherein the sensor and the corrective element are fixed within the camera, the corrective element being located between the windshield and the sensor.

3. The windshield corrective optical system of claim 2, wherein the camera includes at least a first lens group and a second lens group, the first lens group, the second lens group and the sensor being arranged in series order away from the windshield.

4. The windshield corrective optical system of claim 3, wherein the first lens group and the second lens group are positioned between the corrective element and the sensor.

5. The windshield corrective optical system of claim 3, wherein the corrective element is positioned between the first lens group and the second lens group and further including an aperture stop induced point of intersection of the light rays located between the corrective element and the second lens group.

6. The windshield corrective optical system of claim 3, wherein the corrective element is positioned between the first lens group and the second lens group and further including an aperture stop induced point of intersection of the light rays located between the first lens group and the corrective element.

7. The windshield corrective optical system of claim 3, wherein the corrective element is positioned between the second lens group and the sensor and further including an aperture stop induced point of intersection of the light rays located between the first lens group and the second lens group.

8. The windshield corrective optical system of claim 1, wherein the corrective element is formed of a PK1 glass material.

9. A windshield corrective optical system, comprising:
a motor vehicle having a windshield oriented at a rake angle and an occupant compartment;
a camera positioned within the occupant compartment directed toward the windshield and positioned to receive light rays passing through the windshield and within a field-of-view of the camera;
a sensor within the camera configured to receive the light rays passing through the windshield; and
a corrective element positioned within the camera ahead of the sensor configured to receive the light rays prior to passage of the light rays to the sensor, the corrective element configured to correct aberrations of the light rays induced by the rake angle of the windshield as the light rays pass through the corrective element prior to the light rays reaching the sensor, the corrective element being positioned within the camera, and the camera being positioned in a line of sight of the windshield such that the light rays travel from the windshield directly to the camera; and wherein the corrective element is oriented at a corrective angle oriented opposite to the rake angle, an absolute value of the rake angle is equal to an absolute value of the corrective angle, the rake angle has a positive value, the corrective angle has a negative value, the camera is elongated along a camera axis, the windshield is elongated along a windshield axis, the rake angle is defined from the camera axis to the windshield axis, the corrective element is elongated along an element axis, the corrective angle is defined from the camera axis to the element axis, the corrective element has a first index of refraction, the windshield has a second index of refraction, the first index of refraction is equal to the second index of refraction, the corrective element has a first surface and a second surface opposite the first surface, the first surface is flat, the second surface is flat, the first surface is parallel to the second surface, the windshield corrective optical system further includes a first anti-reflective coating applied to the first surface of the corrective element, the windshield corrective optical system further includes a second anti-reflective coating applied to the second surface of the corrective element, the first index of refraction is 1.5038, the corrective element has an Abbie number, the Abbie number is 66.922, the rake angle is 60 degrees, and the corrective angle is −60 degrees.

10. The windshield corrective optical system of claim 9, wherein the camera includes at least a first lens group and a second lens group, with the first lens group, the second lens group and the sensor arranged in series order away from the windshield.

11. The windshield corrective optical system of claim 9, wherein a geometric shape of the corrective element is configured to correct the aberrations of the light rays further induced by a radius of curvature of the windshield in a vertical direction, resulting in the corrective element defining a toroidal optic or a cylindrical optic.

12. The windshield corrective optical system of claim 9, wherein the camera includes an imaging system configured to generate, transmit and receive LIDAR signals.

13. The windshield corrective optical system of claim 9, wherein the corrective element is formed of a PK1 glass material.

14. A method for correcting aberrations of light rays passing through a windshield, comprising:
orienting a windshield of a motor vehicle at a rake angle;
mounting a camera within an occupant compartment of the motor vehicle directed toward the windshield and configured to receive light rays through the windshield;
locating a sensor within the camera configured to receive the light rays; and
positioning a corrective element within the camera ahead of the sensor configured to direct passage of the light rays through the corrective element to the sensor, and to correct aberrations of the light rays passing through the windshield induced by the rake angle of the windshield prior to the light rays reaching the sensor, the corrective element being positioned within the camera, and the camera being positioned in a line of sight of the windshield such that the light rays travel from the windshield directly to the camera; and
wherein the corrective element is oriented at a corrective angle oriented opposite to the rake angle, an absolute value of the rake angle is equal to an absolute value of the corrective angle, the rake angle has a positive value, the corrective angle has a negative value, the camera is elongated along a camera axis, the windshield is elongated along a windshield axis, the rake angle is defined from the camera axis to the windshield axis, the corrective element is elongated along an element axis, the corrective angle is defined from the camera axis to the element axis, the corrective element has a first index of refraction, the windshield has a second index of refraction, the first index of refraction is equal to the second index of refraction, the corrective element has a first surface and a second surface opposite the first surface, the first surface is flat, the second surface is flat, the first surface is parallel to the second surface, the a first anti-reflective coating is applied to the first surface of the corrective element, a second anti-reflective coating is applied to the second surface of the corrective element, the first index of refraction is 1.5038, the corrective element has an Abbie number, the Abbie number is 66.922, the rake angle is 60 degrees, and the corrective angle is −60 degrees.

15. The method of claim 14, further including arranging in series order within the camera at least a first lens group, a second lens group and the sensor away from the windshield.

* * * * *